United States Patent [19]

Watanabe et al.

[11] 3,778,789

[45] Dec. 11, 1973

[54] HIGH-SPEED TRANSMISSION SYSTEM FOR MAGNETIC BUBBLES

[75] Inventors: Teruji Watanabe, Niza; Hideo Ishihara, Kamakura, both of Japan

[73] Assignee: Kokusai Denshin Denwa Kabushiki Kaisha, Tokyo-to, Japan

[22] Filed: Aug. 7, 1972

[21] Appl. No.: 278,472

[30] Foreign Application Priority Data

Aug. 10, 1971 Japan .............................. 46/59961

[52] U.S. Cl. .............................. 340/174 TF, 307/88 LC

[51] Int. Cl. .............................. G11c 11/14

[58] Field of Search .............................. 340/174 TF; 307/88 LC

[56] References Cited

UNITED STATES PATENTS 3,653,010 3/1972 Copeland .............................. 340/174 TF

*Primary Examiner*—James W. Moffitt
*Attorney*—Robert E. Burns et al.

[57] ABSTRACT

A transmission system for magnetic bubbles in a magnetic plate by use of a number of hold sections closely disposed on the magnetic plate, in which the hold sections are drive sections excited by three phase drive currents. The drive sections are formed into a cascade arrangement of a plurality of unit circulating loops, each of which comprises three drive sections excited respectively by the three-phase drive currents and disposed adjacently to one another, so that a magnetic bubble circulates in each of the unit circulating loops while a magnetic bubble held in a drive section (excited by a drive current of phase I by way of example) of a unit circulating loop can be shifted to a drive section (excited by a drive current of phase II succeeding to the phase I) of an immediately adjacent circulating loop. If an input magnetic bubble is applied to one of the unit circulating loops, an output magnetic bubble can be simultaneously obtained from another of the unit circulating loops by successive shift of magnetic bubbles from a preceding one to a succeeding one of the unit circulating loops. The drive sections may be formed into an alternate cascade arrangement of the unit circulating loops and auxiliary drive sections.

3 Claims, 28 Drawing Figures

HIGH-SPEED TRANSMISSION SYSTEM FOR MAGNETIC BUBBLES

This invention relates to a transmission system for magnetic bubbles in a magnetic plate having the easy magnetization direction along the direction of thickness.

In a feeble-magnetic plate (e.g. orthoferrite $RFeO_3$; where "R" is a rare earth element) having the easy magnetization direction along the direction of thickness, a magnetic bubble can be produced under a direct-current bias field $H_b$ so as to have a magnetization direction in reverse to the bias field. This magnetic bubble can be moved in the magnetic plate by a proper magnetic potential provided at the vicinity of the magnetic bubble. In view of the above principle, logical operations can be performed as well as memory function in accordance with mutual actions among a plurality of magnetic bubbles.

In this case, it is necessary to transmit the magnetic bubbles in a high speed to perform the above logical operations with respect to magnetic bubbles located at sufficiently separated positions. To meet with the requirement, a compressor circuit have been proposed in the art. In this compressor circuit, a so-called "T-bar" method is employed, in which a plurality of rectangular magnetic thin films of high permeability are arranged on a magnetic plate, and in which rotating magnetic fields are applied to the rectangular magnetic thin films for successively magnetizing shorter sides of the rectangular magnetic thin films so that a magnetic bubble is transmitted so as to be attracted in order the shorter sides of the rectangular magnetic thin films.

However, the transmissible direction of the magnetic bubble in the compressor circuit using the "T-bar" method is limited to a uni-direction if the rotating direction of the rotating magnetic field is fixed. Accordingly, sufficient freedom for transmitting magnetic bubbles located at separated positions cannot be obtained in the art.

An object of this invention is to provide a high speed transmission system for magnetic bubbles in which the magnetic bubbles can be bidirectionally transmitted.

The principle, the constructions and the operations of the system of this invention will be understood from the following detailed discussion taken in conjunction with the accompanying drawings, in which.

Figure 1A:
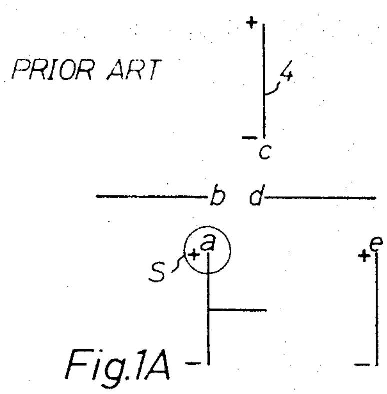
FIGS. 1A, 1B and 1C are disgrams explanatory of a conventional compressor circuit.
Figure 1B:
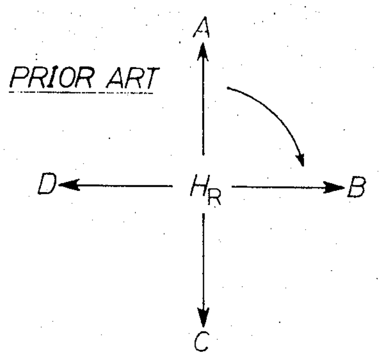
Figure 1C:
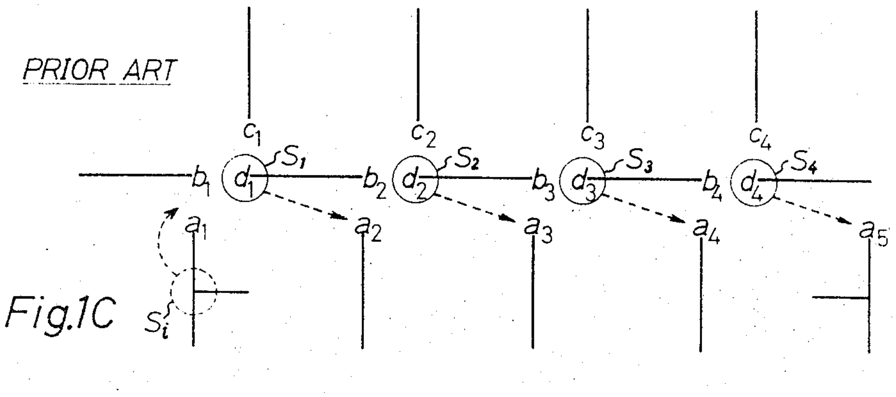

To make the difference between this invention and the conventional art clear, the compressor circuit using a so-called "T-bar" method is described at first with reference to FIGS. 1A, 1B and 1C. In each of FIGS. 1A and 1C, a circulating-shift circuit for magnetic bubbles is illustrated and has a plurality of rectangular ferromagnetic thin films 4 of high permeability. At the time when a rotating magnetic field $H_R$ shown in FIG. 1B is directed to a direction A, the rectangular ferromagnetic thin film 4 is magnetized to the direction designated by notations "+" and "–". Accordingly, a magnetic bubble S is attracted to the position of a shorter side *a* of one of the rectangular ferromagnetic thin films 4. At the next time when the rotating magnetic field $H_R$ is directed to a direction B shifted by 90° from the direction A, the magnetic bubble S is attracted by a shorter side *b* of another rectangular ferromagnetic thin film. In the similar manner, the magnetic bubble S moves thereafter along shorter sides *c–d–a* in response to the circulation C–D–A of the circulating magnetic field $H_R$. When the magnetic bubble S is attracted by the shorter side *d* while the rotating magnetic field $H_R$ is now directed to the direction A, the magnetic bubble S has two movable positions *a* and *e* which are simultaneously magnetized in the polarity "+". However, since the distance between positions $d - a$ is shorter than the distance between positions $d - e$, the magnetic bubble S moves along a path $d - a$.

A compressor circuit is shown in FIG. 1C, in which four circulating-shift circuits shown in FIG. 1A are employed. In this circuit, four magnetic bubbles $S_1$, $S_2$, $S_3$ and $S_4$ are respectively circulated in four circulating paths ($a_1$–$b_1$–$c_1$–$d_1$–$a_1$), ($a_2$–$b_2$–$c_2$–$d_2$–$a_2$), ($a_3$–$b_3$–$c_3$–$d_3$–$a_3$) and ($a_4$–$b_4$–$c_4$–$d_4$–$a_4$) under control of four circulating magnetic fields. In this case, no output magnetic bubble is obtained from a position $a_5$. If an input magnetic bubble $S_i$ designated by a dotted circle is applied in the circulating path $a_1$–$b_1$–$c_1$–$d_1$–$a_1$ while the rotating magnetic field is applied in the direction D, the input magnetic bubble $S_i$ moves to the position $a_1$ when the rotating magnetic field is applied in the direction A. Accordingly, a magnetic bubble $S_i$ located at the position $d_1$ moves to a position $a_2$ by the repelling acting between the input magnetic bubble Si and the circulating magnetic bubble $S_1$. In the similar manner, magnetic bubbles $S_3$ and $S_4$ are shifted to positions $a_4$ and $a_5$ respectively. In other words, the magnetic bubbles $S_1$, $S_2$, $S_3$ and $S_4$ are simultaneously shifted to the positions $a_2$, $a_3$, $a_4$ and $a_5$ respectively in response to the application of the input magnetic bubble Si. Accordingly, an output magnetic bubble is obtained from the position $a_5$.

However, the transmissible direction of the magnetic bubble in this compressor circuit is limited to a unidirection.

Figure 2:
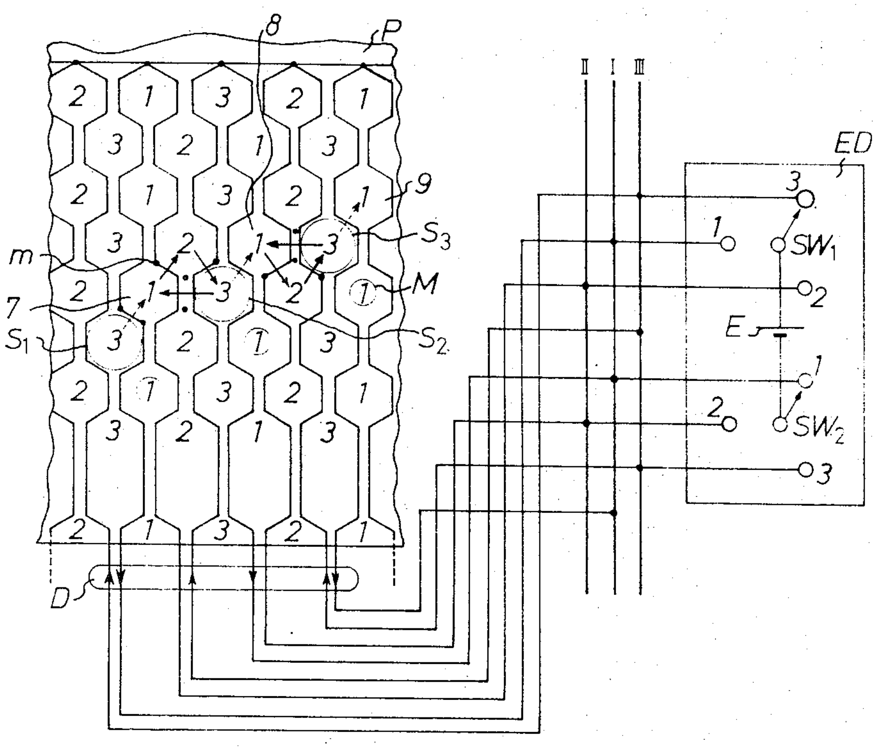
FIG. 2 is a circuit diagram illustrating an embodiment of this invention.

With reference to FIG. 2, an example of this invention comprises a magnetic plate P employed for producing and tramsmitting magnetic bubbles, drive lines D disposed closely on the magnetic plate P in the honeycombed pattern for forming a plurality of hexangle drive sections employed for holding the magnetic bubbles, small magnetic spots *m* of high permeability, magnetic spots M magnetized so as to repel the magnetic bubbles, and an exciting source ED comprising a dc source E, and switches $SW_1$ and $SW_2$. Respective one ends of the drive lines D are connected as shown to common lines I, II and III, which are further connected to terminals 1, 2 and 3 of the switches $SW_1$ and $SW_2$ respectively as shown. Respective other ends of the drive lines D are commonly connected to one another. The switches $SW_1$ and $SW_2$ are switched in the ganging manner so that the switch $SW_1$ successively selects contacts 3, 2 and 1 while the switch $SW_2$ successively selects contacts 1, 2 and 3. Accordingly, if the switch $SW_1$ selects the contact 1 while the switch $SW_2$ selects the contact 2, drive sections of phase I designated by references 1 are excited. If the switch $SW_1$ selects the contact 2 while the switch $SW_2$ selects the contact 3, the drive sections of phase II designated by references 2 are excited. Moreover, if the switch $SW_1$ selects the contact 3 while the switch $SW_2$ selects the contact 1, the drive sections of phase III designated by reference 3 are excited. Accordingly, if the drive sections are excited in the order of phases I, II and III, magnetic bubbles can be transmitted in the order of drive sections 1, 2 and 3. In this case, a magnetic bubble held by one of the drive section can be transferred along one of first three possible directions which are spaced every angle of 120°. Moreover, a magnetic bubble can be accepted by one of drive sections along one of second three possible directions which are spaced every angle of 120° and shifted from the first three possible directions by half the angle 120°. The magnetic spots *m* and M are employed to determine one transmission direction selected from the first or second three possible directions.

In the system of this invention, circulating loops each comprising three drive sections 1, 2 and 3 are successively and adjacently located so as to hold magnetic bubbles respectively in the circulating manner. In FIG. 2, magnetic bubbles $S_2$ and $S_3$ circulate respectively in two circulating loops each designated by references 1, 2 and 3 and solid arrows. If a magnetic bubble $S_1$ is shifted to a drive section as illustrated, this magnetic bubble $S_1$ is shifted to a drive section 7 of a circulating loop so that the magnetic bubble $S_2$ is shifted to a drive section 8 of another circulating loop in response to the repelling action by the shifted magnetic bubble $S_1$. Accordingly, since the magnetic bubble $S_3$ cannot be shifted to the drive section 8, this magnetic bubble $S_3$ is shifted to a drive loop 9 as an output of a high transmission system of this invention.

If the magnetic bubble $S_1$ is shifted until the drive section 9 by no use of the above high transmission system, seven periods of drive currents are necessary. However, only two periods 3 and 1 of drive currents are possible to transmit the magnetic bubble $S_1$ until the drive section 9. This characteristic of the system of this invention can be also obtained even if the system comprises a number of circulating loops.

Other example of this invention are described below with reference to FIGS. 3A, 3B, 3C, 3D, 4A, 4B, 4C, 4D, 4E, %a, 5B, 5C, 5D, 5E, and 6A. In these Figures, drive sections of honeycombed pattern are omitted for simple illustration except reference numerals 1, 2 and 3, which represent exciting phases I, II and III respectively. Moreover, the magnetic spots *m* and M employed for determining the transmission directions of the magnetic bubbles are omitted, while circulating directions and shifting directions are indicated by solid arrows and dotted arrows respectively.

Figure 3A:
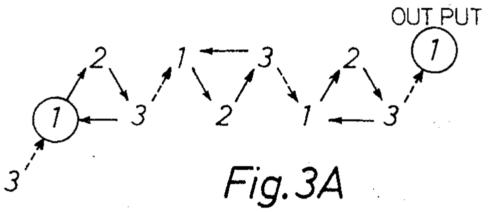
FIGS. 3A, 3B, 3C, 3D, 4A, 4B, 4C, 4D, 4E, 5A, 5B, 5C, 5D and 5E are diagrams explanatory of high speed transmission of magnetic bubbles in accordance with this invention.
Figure 3B:
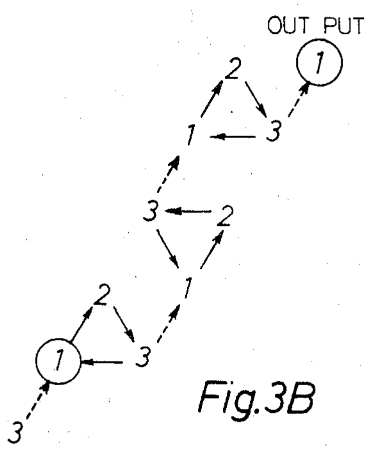
Figure 3C:
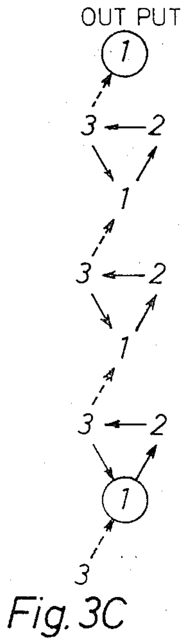

With reference to FIGS. 3A, 3B and 3C, an output is obtained from an output drive section of a straight transmission circuit when an input magnetic bubble is applied to an input drive section in synchronism with the drive current of phase I.

Figure 3D:
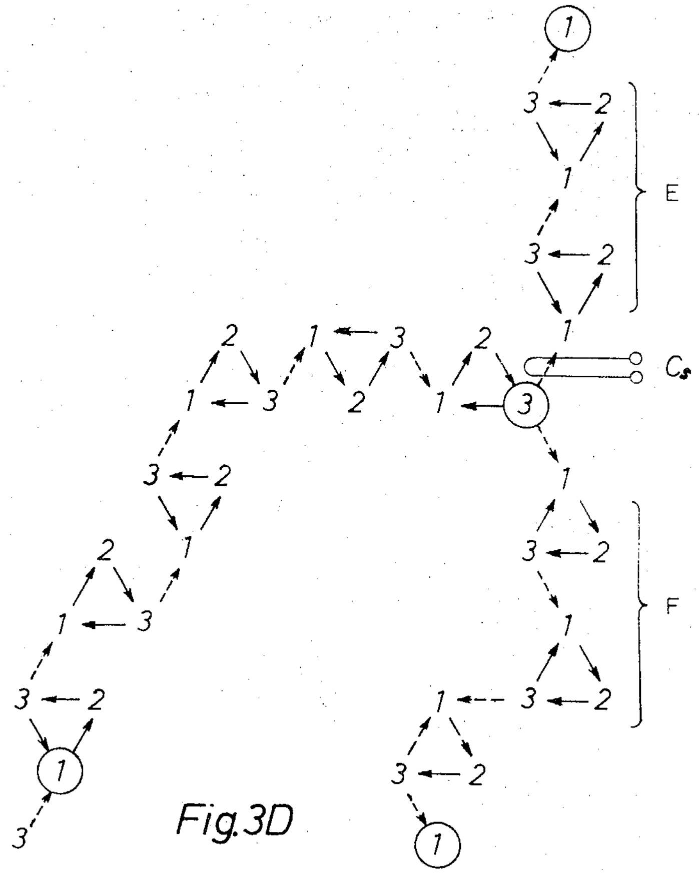

A transmission circuit formed by a combination of the straight transmission circuits shown in FIGS. 3A, 3B and 3C is shown in FIG. 3D, in which a control coil *Cs* is employed for determining one of two possible transmission directions E and F by use of an attractive force or a repelling force caused by the control current of the control coil *Cs*.

Figure 4A:
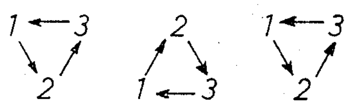
Figure 4B:
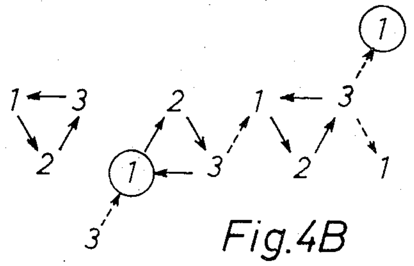
Figure 4C:
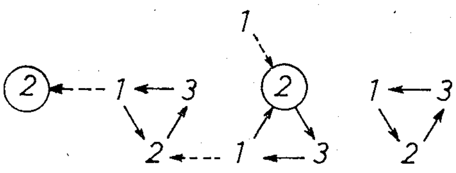
Figure 4D:
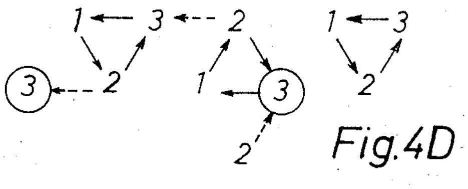

In FIG. 4A, three drive loops are successively and adjacently arranged. In this circuit, if an input magnetic bubble is applied in synchronism with the exciting current of phase I, an output is obtained from an output drive section excited by the drive current of phase I as shown in FIG. 4B. If an input magnetic bubble is applied in synchronism with the exciting current of phase II, an output is obtained from an output drive section excited by the drive current of phase II as shown in FIG. 4C. Moreover, if an input magnetic bubble is applied in synchronism with the exciting current of phase III, an output is obtained from an output drive section excited by the drive current of phase III. As understood from the above operations, an output is obtained from different drive sections of the same transmission circuit in response to application of the input magnetic bubble to different drive sections.

Figure 4E:
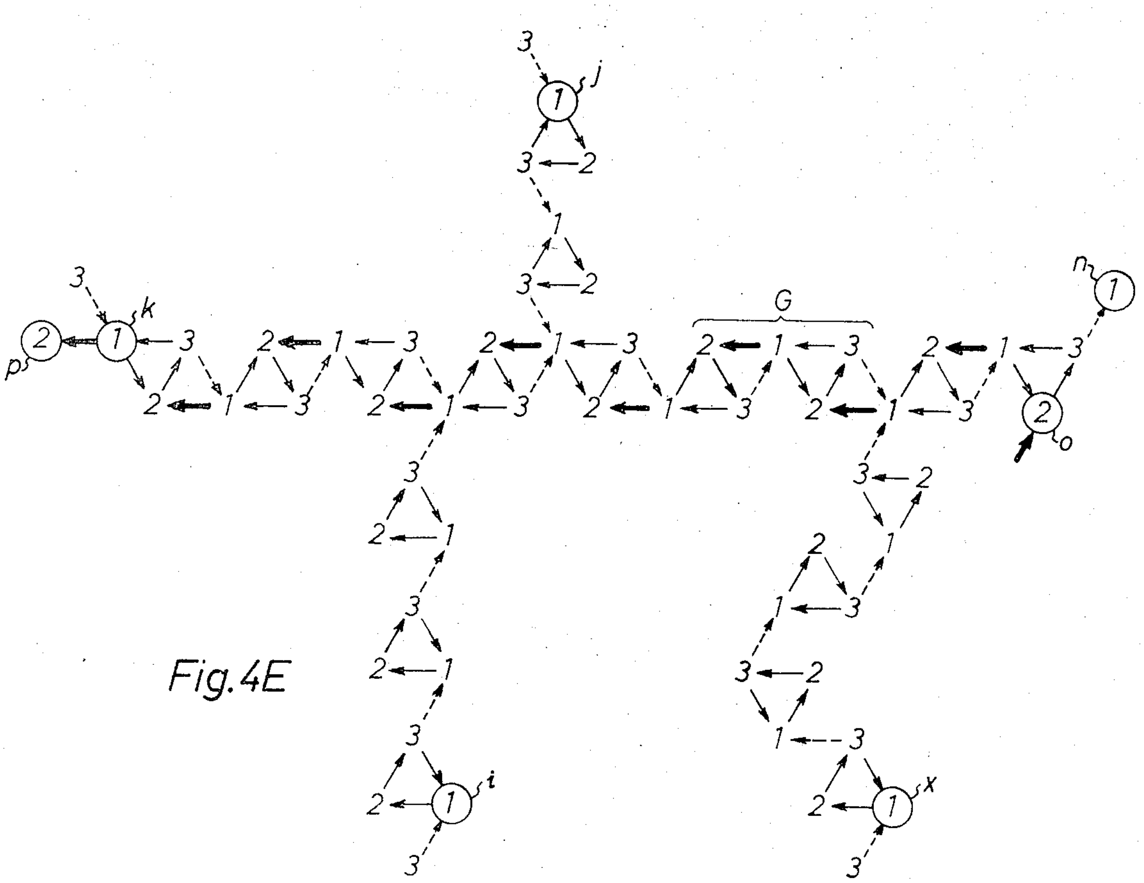

FIG. 4E shows a combined transmission circuit of this invention, in which an output is always obtained from an output drive section *n* of phase I if an input magnetic bubble is applied to any of drive sections *i*, *j*, *k* and *x* of phase I for a high speed transmission circuit G. As understood from the above operations, a transmission circuit of this invention gives access thereto from many positions, while an output is obtained after the period between two exciting current of adjacent phases. Moreover, if an input magnetic bubble is applied to a drive section *o* of the same transmission circuit in synchronism with the exciting current of phase II, an output is obtained from a drive section *p* of phase II after transmission along solid heavy arrows.

With reference to FIGS. 5A, 5B, 5C, 5D and 5E, transmission circuits arranged in an intersection fashion are described. In each example, a horizontal transmission circuit $C_h$ and a vertical transmission circuit $C_v$ are orthogonally intersected.

Figure 5A:
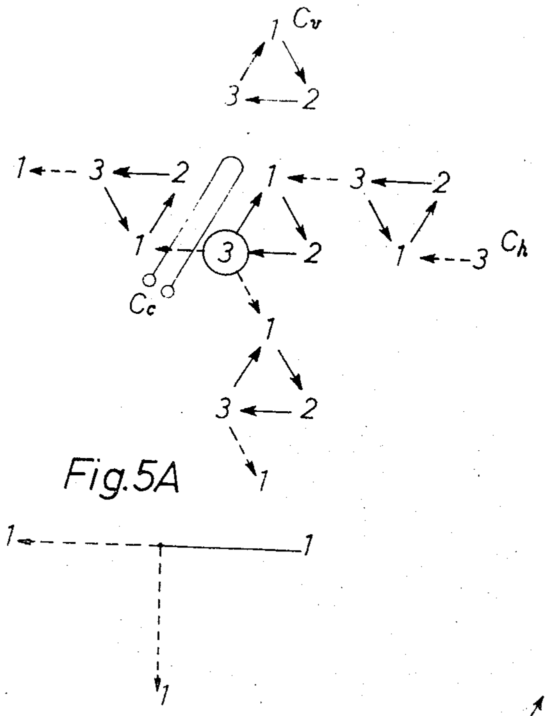
Figure 5B:
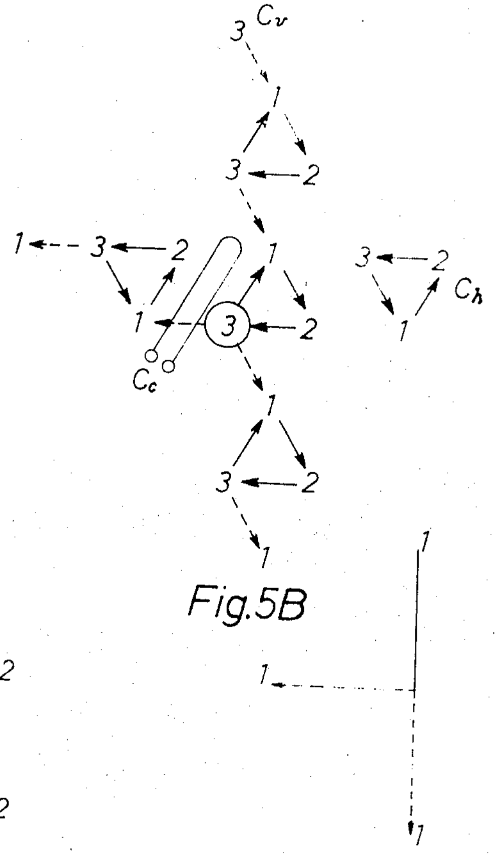
Figure 5C:
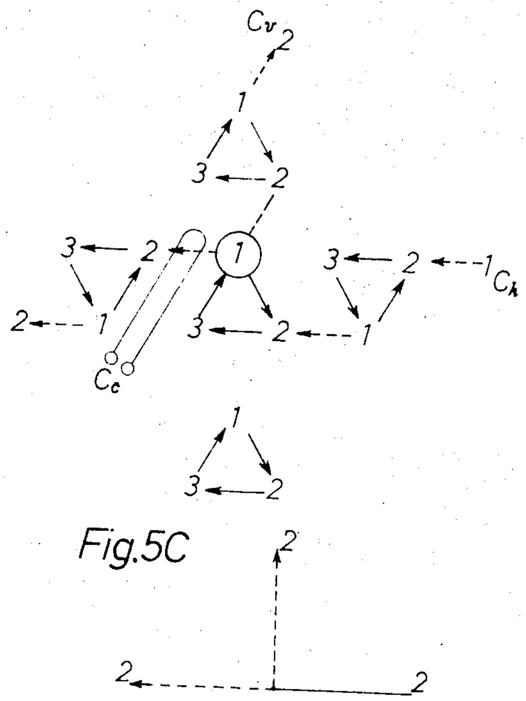
Figure 5D:
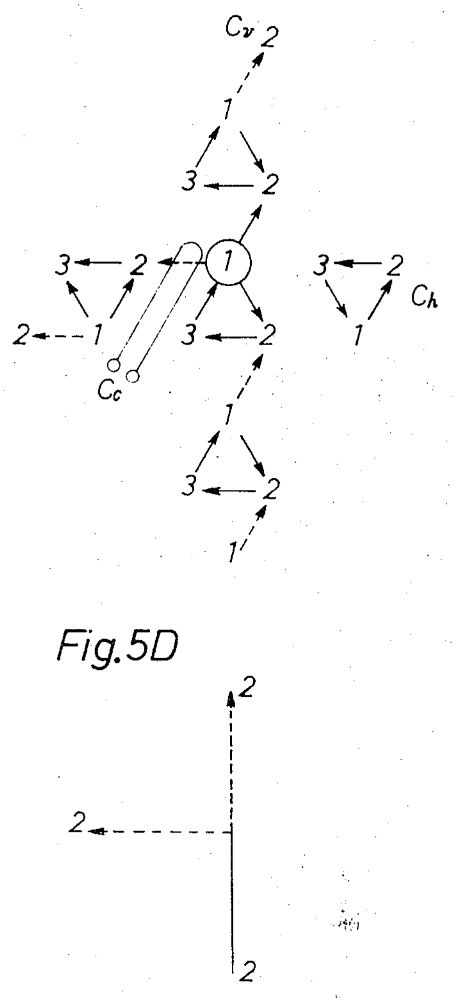
Figure 5E:
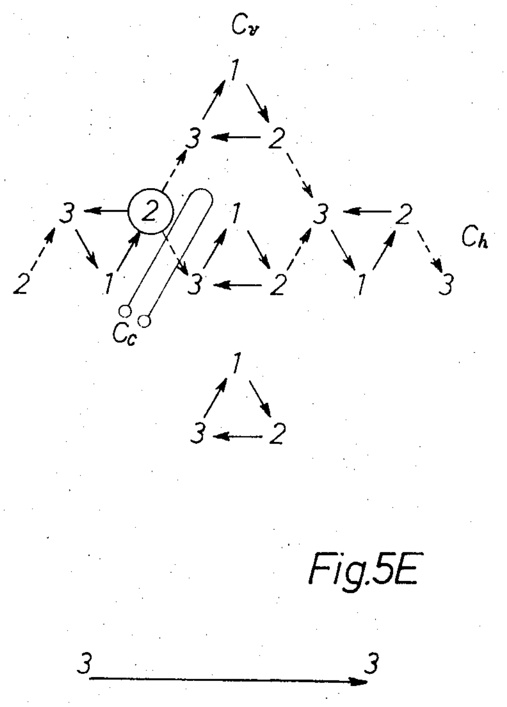

In FIG. 5A, an input magnetic bubble is applied to an input drive section of phase I in the horizontal transmission circuit $C_h$, while one of two shiftable directions from a drive section (3) of a center circulating loop is determined by the current direction of a control coil $C_c$. Accordingly, a shifted magnetic bubble travels straightly or turns in the downward direction as shown by dotted arrows in the lower part. In FIG. 5B, an input magnetic bubble is applied to an input drive section of phase I in the vertical transmission circuit $C_v$, while one of two shiftable directions from a drive section (3) of a center circulating loop is determined by the current direction of a control coil $C_c$. A shifted magnetic bubble in this example travels in the downwardly or turns in the left direction as shown by dotted arrow in the lower part. In FIG. 5C, an input magnetic bubble is applied to an input drive section of phase II in the horizontal transmission circuit $C_h$, while one of two shiftable directions from a drive section (1) of a center circulating loop is determined by the current direction of a control coil $C_c$. A shifted magnetic bubble in this example travels straightly or turns to the upward direction. In FIG. 5D, an input magnetic bubble is applied to an input drive section of phase II in the vertical transmission circuit $C_v$, while one of two shiftable directions from a drive section (1) of a center circulating loop is determined by the current direction of a control coil $C_c$. A shifted magnetic bubble in this example travels straightly or turns in the left direction. In FIG. 5E, an input magnetic bubble is applied to an input drive section of phase III in the horizontal transmission circuit $C_h$. In this case, since a upwardly turned magnetic bubble from a drive section (2) of a center circulating loop causes a shift of a magnetic bubble from a drive section (2) of the shifted vertical circulating loop to a drive section (3) of a circulating loop in the horizontal transmission circuit, a shifted magnetic bubble in this example travels straightly as shown in the lower part by a solid arrow.

Figure 6A:
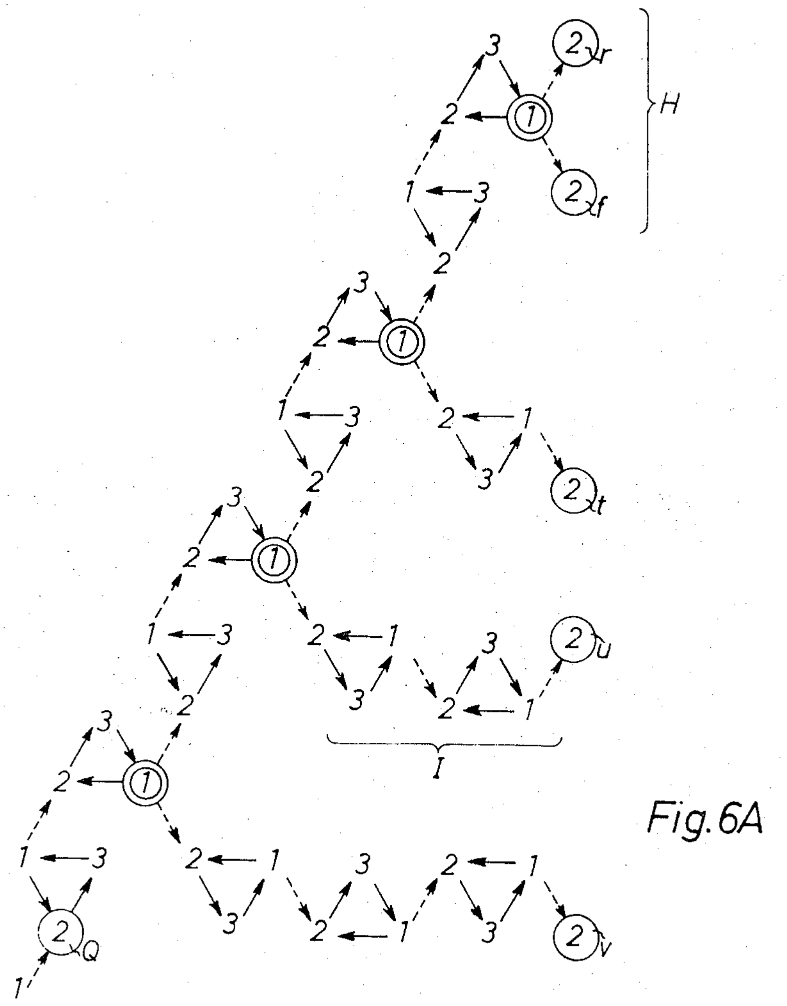
FIGS. 6A, 6B and 6C are diagrams explanatory of an example of a high speed FANOUT circuit provided in accordance with this invention.
Figure 6B:
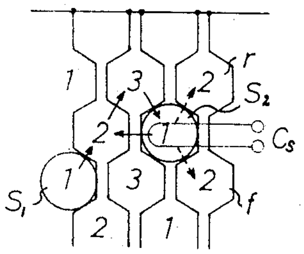
Figure 6C:
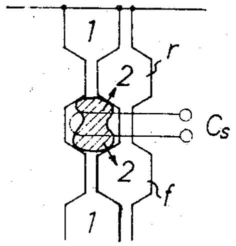

With reference to FIGS. 6A, 6B and 6C, a high-speed FANOUT circuit for magnetic bubbles is described. In FIG. 6A, if an input magnetic bubble is applied to an input drive section Q of phase II, magnetic bubbles each circulating in a corresponding circulating loop are rendered to be shifted from a drive section (1) of the circulating loop to a drive section (2) of an immediately succeeding circulating loop. In this case, appropriate division means (e.g. division coils $C_s$ mentioned below) are provided for dividing into two parts each of magnetic bubbles held in drive sections (1) designated by double circules. The divided two magnetic bubbles are respectively employed as independent inputs of two different transmission circuits as shown. Accordingly, five outputs are simultaneously obtained from drive sections *r*, *f*, *t*, *u* and *v* in response to an input magnetic bubble applied to the input drive section Q in synchronism with the drive current of phase II.

An actual example of a stage H in the high-speed FANOUT circuit shown in FIG. 6A is shown in FIG. 6B for illustrating an example of the above-mentioned division means, while magnetic spots *m* and M are omitted for simple illustration. When a magnetic bubble $S_1$ is shifted to a drive section (2) of a circulating loop, a magnetic bubble $S_2$ circulating in this circulating loop is repelled out by this shifted magnetic bubble $S_1$ to two shiftable directions to drive sections *r* and *f*. Accordingly, if a control current is passed through a division coil $C_s$ so as to repel the shifted magnetic bubble $S_2$ in synchronism with the drive current of phase II, the magnetic bubble $S_2$ is divided into two parts which are respectively shifted to drive sections *r* and *f* as shown in FIG. 6C.

If an output is not necessary for a drive section *u* by way of example, an erasing coil not shown may be provided for erasing one of magnetic bubbles circulating in circulating loops I before application of the input magnetic bubble to the drive section Q.

Figure 7:
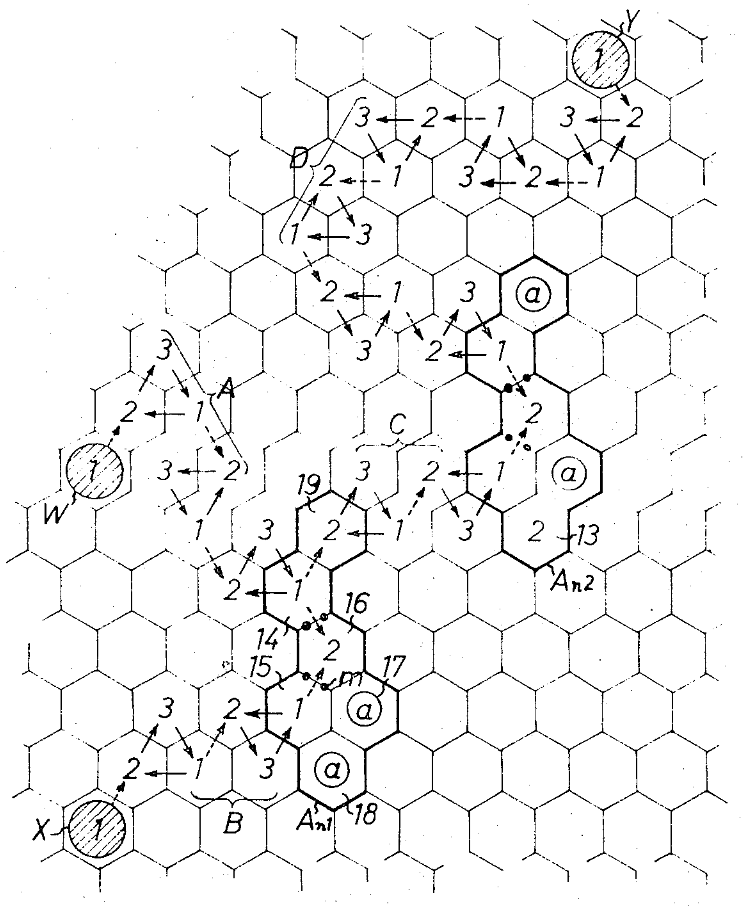
FIG. 7 is a diagram explanatory of an example of an AND circuit provided in accordance with this invention.

With reference to FIG. 7, the AND function of this invention having three inputs is described. In this example, an AND circuit An1 is provided for the AND function of two input *w* and *x*, while an AND circuit An2 is provided for the AND function of another input *y* and an AND output of the AND circuit An1. An AND output for the three inputs *w*, *x* and *y* is obtained from a drive section 13 in response to application of the three inputs *w*, *x* and *y* to the respective drive sections (1) of phase I designated by hatching. This example is also useful as a FANIN circuit for multi-inputs.

The above operations will be further described in details below. In the logical operations using magnetic bubbles, repelling actions among magnetic bubbles and positions of magnetic bubbles are used as information. In the above AND circuit An1, drive sections 14 and 15 are employed as input positions. Moreover, the drive sections 14 and 15 are also employed as output positions of a high-speed transmission circuit. Magnetic bubbles circulating in circulating loops respectively including the input positions 14 and 15 are applied to the input positions 14 and 15 in synchronism with the drive current of phase I. If there are no magnetic bubbles *w* and *x*, the magnetic bubbles held by the drive sections 14 and 15 are not shifted to a drive section 16 in synchronism with the drive current of phase II while the same magnetic bubbles circulate in the respective circulating loops. If only the input magnetic bubble *w* is applied to a drive section of phase II in a high speed transmission circuit A, a magnetic bubble held in the input position 14 of the AND circuit An1 is shifted to the drive section 16 and then shifted to a drive section 17, which has an absorber coil *a* designated by a circle for erasing the shifted magnetic bubble. If only the input magnetic bubble *x* is applied to a drive section of phase II in a high speed transmission circuit B, a magnetic bubble held in the input position 15 of the AND circuit Anl is shifted to the drive sections 16 and 17 and erased by the absorber coil *a*. If two input magnetic bubbles *w* and *x* are simultaneously applied, magnetic bubbles held respectively in the drive sections 14 and 15 are rendered to be shifted to the drive section 16. However, the above magnetic bubbles are shifted respectively to drive sections 19 and 18 by a repelling action therebetween. The magnetic bubble shifted to the drive section 18 is erased by an absorber coil *a*, while the magnetic bubble applied to the drive section 19 becomes an output of the AND circuit An1 and an input of the AND circuit An2. Accordingly, a logical result for the information magnetic bubble *w* and *x* is applied through a high speed transmission circuit C to the input of the AND circuit An2 at the same time as the application of the input magnetic bubbles *w* and *x*. On the other hand, an output of a high speed transmission circuit D caused in response to another input magnetic bubble *y* is also applied to the AND circuit An2, a logical output of the AND circuit An2 for the input magnetic bubbles *w*, *x* and *y* is obtained at a drive section 13.

Figure 9:
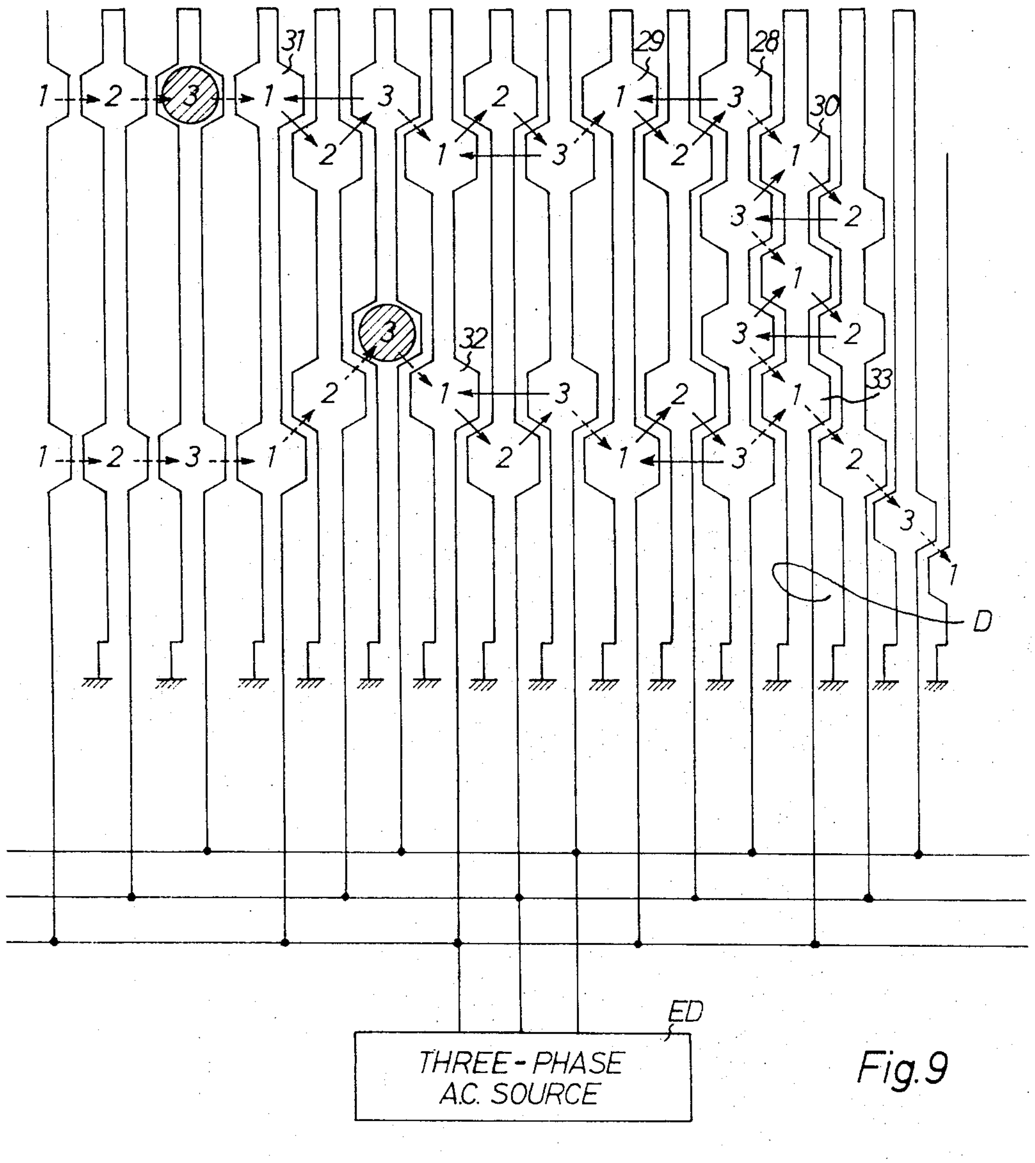
FIG. 9 is a diagram illustrating an example of another high speed transmission circuit of this invention.

As mentioned above, the AND circuit for three inputs *w*, *x* and *y* as shown in FIG. 7 comprises two AND circuits An1 and An2 but produces an output in a period between adjacent two of three drive currents of phases I, II and III. Moreover, the input positions designated by hatching and the output position (13) can be located at any positions. The honeycombed pattern shown in FIG. 7 includes a number of hexangle drive sections, while connection lines among drive sections of the same phase I, II or III arranged along the same vertical line are omitted for simple illustration. The honeycombed pattern of the drive sections may be constructed as shown in FIGS. 2 and 9 or as disclosed in our pending U. S. Pat. application No. 129,705 filed on Mar. 31, 1971.

With reference to FIGS. 8A, 8B, 8C, 8D and 8E, high speed transmission in a magnetic plate having a large magnetic induction M*s* will be described.

Figure 8A:
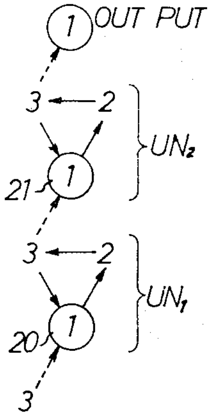
FIGS. 8A, 8B, 8C, 8D and 8E are diagrams explanatory of other examples of a high speed transmission circuit of this invention.

FIG. 8A shows an example of the above mentioned high speed tramsmission circuits, which comprise unit circulating loops $UN_1$, $UN_2$, ... For example, a distance between drive sections 20 and 21 of phase I is about twice the diameter of the magnetic bubble. If the magnetic induction M*s* of the magnetic plate producing therein the magnetic bubbles is large, stable operations cannot be obtained by unnegligible repelling forces among magnetic bubbles which cliculate respectively unit circulating loops $UN_1$, $UN_2$, ...... .

Figure 8B:
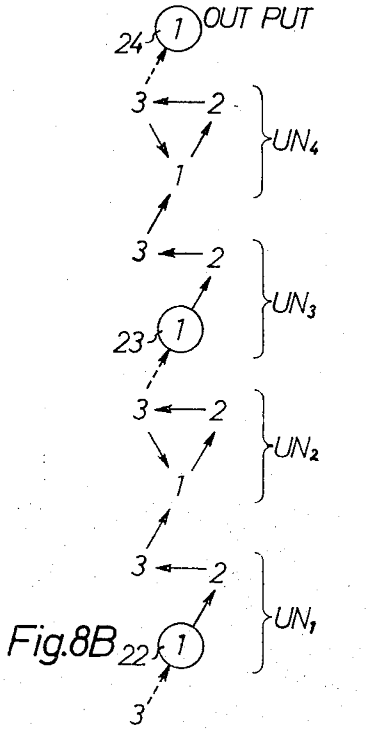

For eliminating the above unstable operations, a high speed transmission circuit may be formed by an alternate cascade arrangement of normal unit circulating loops $UN_2$, $Un_4$ and auxiliary circuits $UN_1$ and $UN_3$ as shown in FIG. 8B. In this example, if a magnetic bubble is shifted to a drive section 22 of phase I in the auxiliary circuit $UN_1$, a magnetic bubble cilulating in the normal unit circulating loop $UN_2$ is shifted to a drive section 23 of phase I in the auxiliary circuit $UN_3$ by a repelling force between these two magnetic bubbles.

Similarly, a magnetic bubble circulating in the normal unit circulating loop $UN_4$ is shifted to a drive section 24 and becomes an output by the repelling force caused by the magnetic bubble shifted to the drive section 23. In this case, no magnetic bubble circulates in each of the normal unit circulating loops $UN_2$ and $UN_4$. However, magnetic bubbles held respectively in the drive sections 22 and 23 are shifted to the normal circulating loops $UN_2$ and $UN_4$ in response to the drive currents of phases I, II, III nd I. The access interval of the example shown in FIG. 8B is twice that of the example shown in FIG. 8A.

Figure 8C:
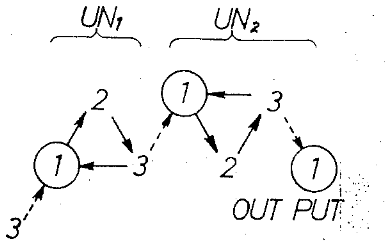
Figure 8E:
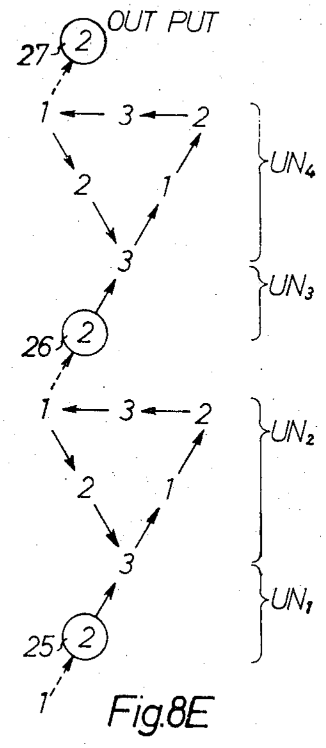
Figure 8D:
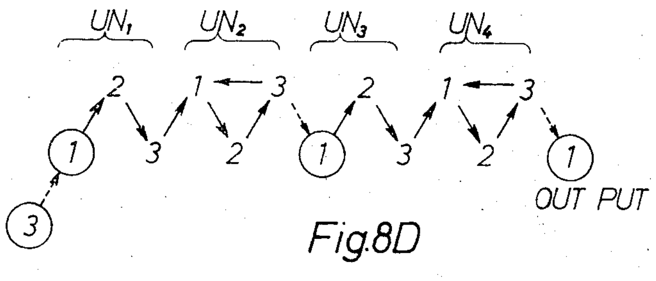

FIG. 8D is an example of a horizontal transmission circuit using a magnetic plate of large magnetic induction Ms, which is formed by an alternate cascade arrangement of normal unit circulating loops $UN_2$ and $UN_4$ and auxiliary circuits $UN_1$ and $UN_3$, while FIG. 8C is an ordinary horizontal transmission circuit of this invention.

FIG. 8E is another example of a high speed transmission circuit using a magnetic plate of large magnetic induction Ms, which is formed by an alternate cascade arrangement of larger unit circulating loops $UN_2$ and $UN_4$ and auxiliary circuits $UN_1$ and $UN_3$. Each of the larger unit circulating loops comprises sic drive sections, which has a circulating period equal to twice that of the circulating period of the unit circulating loop of three drive sections. If an input magnetic bubble is shifted to a drive section 25 of phase II, a magnetic bubble circulating in the larger circulating loop $UN_2$ is shifted to a drive section 26 of phase II by repelling action of the input magnetic bubble. Accordingly, a magnetic bubble circulating in the larger circulating loop $UN_4$ is shifted as an output to a drive section 27 of phase II by repelling action of the shifted magnetic bubble of the drive section 26. In this case, no magnetic bubble circulates in each of the larger circulating loops $UN_2$ and $UN_4$. However, magnetic bubbles held respectively in the drive sections 25 and 26 are shifted to the larger circulating loops in response to the drive currents of Phases II and III.

The transmissible directions of the magnetic bubbles can be determined by no use of the aforementioned magnetic spots *m* and M as shown in FIG. 9, in which the drive sections are formed by a looped conductor D for each phase I, II and III while the looped conductors D of the phases I, II and III are successively excited by a three-phase AC source ED. In each of the looped conductors D, only necessary drive sections are formed into hexangle patterns except pairs of parallel lines of unnecessary parts. Some of the drive sections (e.g. 28) in this example have two transmissible directions 29 and 30. In this case, however, since the distance between the drive sections 28 and 29 is larger than the distance between the drive sections 28 and 30, a magnetic bubble held in the drive section 28 is shifted to only the drive section 30. Accordingly, transmissible directions of all the magnetic bubbles can be determined by no use of magnetic spots. In this example, a magnetic bubble is circulating in each of unit circulating loops designated by solid arrows in case of no input magnetic bubble at the drive sections 31 and 32. If an input magnetic bubble is applied from drive sections designated by hatching to any of drive sections 31 and 32 in synchronism with the drive current of phase I, all the magnetic bubbles respectively circulating in the unit circulating loops are simultaneously shifted along dotted arrows so that an output can be obtained from an output position 33. This example operates as an OR circuit.

What we claim is:

1. A high speed transmission system for magnetic bubbles, comprising:

a magnetic plate;

a plurality of drive sections closely disposed on the magnetic plate; and a current source coupled to the drive sections and supplying drive currents of three phases to the drive sections, so that the drive sections are formed into at least one cascade arrangement of a plurality of unit circulating loops, each of which comprises three drive sections excited respectively by the three-phase drive currents, a magnetic bubble circulating in each of the unit circulating loops while a magnetic bubble held in a drive section of a unit circulating loop now excited by a drive current of one phase can be shifted to a drive section of an immediately adjacent circulating loop excited by a drive current of another phase succeeding to said one phase, whereby when an input magnetic bubble is applied to one of the unit circulating loops, an output magnetic bubble can be simulataneously obtained from another of the unit circulating loops by successive shift of magnetic bubbles from a preceding one to a succeeding one of the unit circulating loops.

2. A high speed transmission system for magnetic bubbles, comprising:

a magnetic plate;

a plurality of drive sections closely disposed on the magnetic plate; and a current source coupled to the drive sections and supplying drive currents of three phases to the drive sections, so that the drive sections are formed into at least one alternate cascade arrangement of a plurality of unit circulating loops and a plurality of auxiliary circuits, each of said unit circulating loops comprising three drive sections excited respectively by the three-phase drive currents, each of said auxiliary circuits comprising at least one drive section excited by the drive current of the same phase, a magnetic bubble circulating in each of the unit circulating loops while a magnetic bubble held in a drive section of a unit circulating loop now excited by a drive current of one phase can be shifted through one of said auxiliary circuits to a drive section of an immediately adjacent circulating loop excited by a drive current of another phase succeeding to said one phase, whereby when an input magnetic bubble is applied to one of the unit circulating loops, an output magnetic bubble can be simultaneously obtained from another of the unit circulating loops by successive shift of magnetic bubbles from a preceding one to a succeeding one of the unit circulating loops through one of said auxiliary circuits.

3. A high speed transmission system for magnetic bubbles, comprising:

a magnetic plate;

a plurality of drive sections closely disposed on the magnetic plate; and a current source coupled to the drive sections and supplying drive currents of three phases to the drive sections, so that the drive sections are formed into at least one alternate cascade arrangement of a plurality of unit circulating loops and a plurality of auxiliary circuits, each of said unit circulating loops comprises six drive sections excited successively by the three-phase drive currents, each of said auxiliary circuits comprising at least one drive section excited by the drive current of the same phase, a magnetic bubble circulating in each of the unit circulating loops while a magnetic bubble held in a drive section of a unit circulating loop now excited by a drive current of one phase can be shifted through one of said auxiliary circuits to a drive section of an immediately adjacent circulating loop excited by a drive current of another phase succeeding to said one phase, whereby when an input magnetic bubble is applied to one of the unit circulating loops, an output magnetic bubble can be simultaneously obtained from another of the unit circulating loops by successive shift of magnetic bubbles from a preceding one to a succeeding one of the unit circulating loops through one of said auxiliary circuits.

* * * * *